(12) United States Patent  
Miao et al.

(10) Patent No.: US 11,983,911 B2  
(45) Date of Patent: May 14, 2024

(54) METHOD AND SYSTEM FOR TRANSMITTING INFORMATION, STORAGE MEDIUM AND ELECTRONIC DEVICE

(71) Applicants: BOE Technology Group Co., Ltd., Beijing (CN); Beijing BOE Optoelectronics Technology Co., Ltd., Beijing (CN)

(72) Inventors: Jinghua Miao, Beijing (CN); Hao Zhang, Beijing (CN); Lili Chen, Beijing (CN); Wenyu Li, Beijing (CN); Qingwen Fan, Beijing (CN); Xuefeng Wang, Beijing (CN); Yufan Du, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 254 days.

(21) Appl. No.: 17/513,785

(22) Filed: Oct. 28, 2021

(65) Prior Publication Data

US 2022/0139284 A1    May 5, 2022

(30) Foreign Application Priority Data

Oct. 30, 2020  (CN) .......................... 202011193316.9

(51) Int. Cl.  
*G06V 10/22*    (2022.01)  
*G09G 3/20*    (2006.01)

(52) U.S. Cl.  
CPC ............... *G06V 10/22* (2022.01); *G09G 3/20* (2013.01); *G09G 2340/0407* (2013.01)

(58) Field of Classification Search  
None  
See application file for complete search history.

(56) References Cited

U.S. PATENT DOCUMENTS

2018/0040144 A1* 2/2018 Li ........................ G06F 16/9577  
2019/0244047 A1* 8/2019 Flosdorf .............. H04N 23/695  
2021/0195157 A1* 6/2021 Stokking .............. H04N 13/344  
2021/0233292 A1* 7/2021 Yokota ............... G02B 27/0172

* cited by examiner

*Primary Examiner* — Yi Wang  
(74) *Attorney, Agent, or Firm* — IPro, PLLC (57) ABSTRACT

Provided is a method and a system for transmitting information. The method is applicable to a processing device, and includes: acquiring a target image of a display device; determining a target area in the target image; and sending display information to the display device, wherein the display information includes information of the target area; wherein the target area is a partial pixel area of the target image, the target area includes pixels with transparencies less than 1, and transparencies of the pixels outside the target area in the target image are all 1.

17 Claims, 6 Drawing Sheets

|   |   |   |   |   |   |   |   |   |   |
|---|---|---|---|---|---|---|---|---|---|
| 1 | 2 | 3 | 3 | 2 | 3 | 3 | 2 | 3 | 3 |
| 3 | 2 | 3 | 3 | 3 | 2 | 3 | 3 | 3 | 3 |
| 2 | 3 | 3 | 3 | 3 | 2 | 3 | 3 | 2 | 3 |
| 3 | 2 | 3 | 3 |   |   |   |   |   |   |

FIG. 4

|   |   |   |   |   |   |   |   |   |   |
|---|---|---|---|---|---|---|---|---|---|
| 1 | 2 | 3 | 3 | 2 | 3 | 3 | 2 | 3 | 3 |
| 3 | 2 | 3 | 3 | 3 | 2 | 3 | 3 | 3 | 3 |
| 2 | 3 | 3 | 3 | 3 | 2 | 3 | 3 | 2 | 3 |
| 3 | 2 | 3 | 3 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 |   |   |   |   |

FIG. 5

| Label | | | | | | | | | | |
|---|---|---|---|---|---|---|---|---|---|---|
| Base coordinate → | 1 | | | | | | | | | |
| Information items of first row of pixels → | 2 | 3 | 3 | 4 | 4 | 4 | 4 | 4 | 4 | 4 |
| Information items of second row of pixels → | 2 | 3 | 3 | 4 | 4 | 4 | 4 | 4 | 4 | 4 |
| Information items of third row of pixels → | 2 | 3 | 3 | 3 | 4 | 4 | 4 | 4 | 4 | 4 |
| Information items of fourth row of pixels → | 2 | 3 | 3 | 3 | 4 | 4 | 4 | 4 | 4 | 4 |
| Information items of sixth row of pixels → | 2 | 3 | 3 | 3 | 3 | 4 | 4 | 4 | 4 | 4 |
| Information items of seventh row of pixels → | 2 | 3 | 3 | 3 | 3 | 4 | 4 | 4 | 4 | 4 |
| Information items of eighth row of pixels → | 2 | 3 | 3 | 4 | 4 | 4 | 4 | 4 | 4 | 4 |
| Information items of ninth row of pixels → | 2 | 3 | 3 | 4 | 4 | 4 | 4 | 4 | 4 | 4 |
| Information items of tenth row of pixels → | 2 | 3 | 3 | 4 | 4 | 4 | 4 | 4 | 4 | 4 |
| Information items of fifth row of pixels → | | 4 | 4 | 4 | 4 | 4 | 4 | 4 | 4 | 4 |

FIG. 6

| | | | | | | | | | |
|---|---|---|---|---|---|---|---|---|---|
| Base coordinates → | 1 | | | | | | | | |
| Information items of first row of pixels → | 2 | 3 | 3 | 4 | 4 | 4 | 4 | 4 | 4 | 4 |
| Information items of second row of pixels → | 2 | 3 | 3 | 4 | 4 | 4 | 4 | 4 | 4 | 4 |
| Information items of third row of pixels → | 2 | 3 | 3 | 3 | 4 | 4 | 4 | 4 | 4 | 4 |
| Information items of fourth row of pixels → | 2 | 3 | 3 | 3 | 4 | 4 | 4 | 4 | 4 | 4 |
| Information items of fifth row of pixels → | 4 | 4 | 4 | 4 | 4 | 4 | 4 | 4 | 4 |
| Information items of sixth row of pixels → | 2 | 3 | 3 | 3 | 3 | 4 | 4 | 4 | 4 | 4 |
| Information items of seventh row of pixels → | 2 | 3 | 3 | 3 | 3 | 4 | 4 | 4 | 4 | 4 |
| Information items of eighth row of pixels → | 2 | 3 | 3 | 4 | 4 | 4 | 4 | 4 | 4 | 4 |
| Information items of ninth row of pixels → | 2 | 3 | 3 | 4 | 4 | 4 | 4 | 4 | 4 | 4 |
| Information items of tenth row of pixels → | 2 | 3 | 3 | 4 | 4 | 4 | 4 | 4 | 4 | 4 |

FIG. 7

| 1 | 2 | 2 | 2 | 2 | 2 | 2 | 2 | 2 | 2 |
|---|---|---|---|---|---|---|---|---|---|
| 3 | 3 | 3 | 3 | 3 | 3 | 3 | 3 | 3 | 3 |
| 3 | 3 | 3 | 3 | 3 | 3 | 3 | 3 | 3 | 3 |
| 3 | 3 | 3 | 3 | | | | | | |

FIG. 8

| 1 | 2 | 2 | 2 | 2 | 2 | 2 | 2 | 2 | 2 |
|---|---|---|---|---|---|---|---|---|---|
| 3 | 3 | 3 | 3 | 3 | 3 | 3 | 3 | 3 | 3 |
| 3 | 3 | 3 | 3 | 3 | 3 | 3 | 3 | 3 | 3 |
| 3 | 3 | 3 | 3 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 | 4 | 4 | 4 | 4 |
| 4 | 4 | 4 | 4 | 4 | 4 | 4 | 4 | 4 | |
| 4 | 4 | 4 | 4 | 4 | 4 | 4 | 4 | 4 | |
| 4 | 4 | 4 | 4 | 4 | 4 | | | | |

METHOD AND SYSTEM FOR TRANSMITTING INFORMATION, STORAGE MEDIUM AND ELECTRONIC DEVICE

CROSS-REFERENCE TO RELATED APPLICATION

The present application is based on and claims priority to Chinese Patent Application No. 202011193316.9, filed on Oct. 30, 2020 and entitled "METHOD AND SYSTEM FOR TRANSMITTING INFORMATION, STORAGE MEDIUM AND ELECTRONIC DEVICE," the disclosure of which is herein incorporated by reference in its entirety.

TECHNICAL FIELD

The present disclosure relates to a method and a system for transmitting information, a storage medium and an electronic device.

BACKGROUND

Augmented Reality (AR) is a technology that calculates the position and the angle of a camera image in real time and adds a corresponding image. This technology is to put the virtual world in the real world on a screen and perform interaction. The AR is widely applied in the fields such as aircraft research and development, data model visualization, virtual training, and entertainment and art with relatively strong authenticity. Moreover, as the computing capability of an electronic device continues to improve, AR is being more and more widely used.

SUMMARY

Embodiments of the present disclosure provide a method and system for processing information, a storage medium, and an electronic device.

In a first aspect of the embodiments of the present disclosure, a method for transmitting information is provided. The method is applicable to a processing device. The method includes: acquiring a target image of a display device; determining a target area in the target image; and sending display information to the display device, wherein the display information includes information of the target area, the target area is a partial pixel area of the target image, the target area includes pixels with transparencies less than 1, and transparencies of pixels outside the target area in the target image are all 1.

In some embodiments, the transparency of at least one edge pixel of the pixels in the target area is less than 1.

In some embodiments, the information of the target area includes: base coordinates of any pixel in the target area in the target image, reference coordinates corresponding to a target row of pixels in the target area, and a pixel value of a target pixel in the target row of pixels;
  the target row of pixels includes P target pixels, and in the case that P is greater than 1, the P target pixels are contiguous;
  the transparency of an edge target pixel in the P target pixels along a pixel row direction is less than 1;
  in the case that the target row of pixels includes other pixels than be P target pixels, the transparencies of the other pixels are equal to 1; and
  the reference coordinates corresponding to the target row of pixels are configured to indicate: coordinates of the target pixel in the target row of pixels relative to the base coordinates.

In some embodiments, the reference coordinates corresponding to the target row of pixels include: coordinates of the edge target pixel relative to the base coordinates.

In some embodiments, the information of the target area includes: the base coordinates arranged in sequence, and information items of the target rows of pixels in the target area, wherein the information items of the target rows of pixels are arranged according to a sequence of pixel rows; and
  the information items of the target row of pixels include: the reference coordinates corresponding to the target row of pixels arranged in sequence, and the pixel value of the target pixel.

In some embodiments, the information of the target area meets any one of the following conditions:
  in the case that the target area includes at least one pixel other than the target pixel, the information of the target area further includes: a pixel value of the at least one pixel arranged following the information items of the target rows of pixels;
  in the case that the target row of pixels further includes the other pixels, the information items of the target row of pixels further include: pixel values of the other pixels arranged following the pixel value of the target pixel;
  in the case that the target area includes other rows of pixels than the target row of pixels, the information of the target area further includes information items of the other rows of pixels, wherein information items of the other rows of pixels include: the pixel values of the pixels in the other rows of pixels; and the information items of the other rows of pixels are arranged following the information items of the target rows of pixels; and
  in the case that the target row of pixels further includes the other pixels, the information items of the target row of pixels further include: the pixel values of the other pixels arranged following the pixel value of the target pixel; in the case that the target area includes the other rows of pixels than the target row of pixels, the information of the target area further includes the information items of the other rows of pixels, wherein the information items of the other rows of pixels include: the pixel values of the pixels in the other rows of pixels; and the information items of the rows of pixels in the target area are arranged according to the sequence of the pixel rows.

In some embodiments, the information of the target area includes: the base coordinates arranged in sequence, the reference coordinates corresponding to the target rows of pixels, and the pixel values of the target pixel in the target rows of pixels; and
  the reference coordinates corresponding to the target rows of pixels are arranged according to the sequence of the pixel rows, and the pixel values of the target pixels in the target rows of pixels are arranged according to the sequence of the pixel rows.

In some embodiments, in the case that the target area includes at least one pixel other than the target pixel, the information of the target area further includes: a pixel value of the at least one pixel arranged following the pixel values of the target pixel in the target rows of pixels.

In some embodiments, the information of the target area further includes: resolution information of the target area.

In some embodiments, the target image is an $(N+1)^{th}$ frame image, N is greater than or equal to 1, and in the case that a non-overlapping area is present between a target area in an $N^{th}$ frame image and a target area in the $(N+1)^{th}$ frame image, the display information further includes: a target indication, wherein the target indication is configured to indicate that transparencies of pixels in the non-overlapping area are all 1.

In some embodiments, the transparency of at least one edge pixel of the pixels in the target area is less than 1, and the information of the target area further includes: the resolution information of the target area;

the target image is an $(N+1)^{th}$ frame image, N being greater than or equal to 1, and in the case that a non-overlapping area is present between a target area in an $N^{th}$ frame image and a target area in the $(N+1)^{t1}$ frame image, the display information further includes: a target indication, wherein the target indication is configured to indicate that transparencies of the pixels in the non-overlapping area are all 1;

the information of the target area meets any one of the following conditions:

the information of the target area includes: the base coordinates arranged in sequence, and information items of target rows of pixels in the target area, wherein the information items of the target rows of pixels are arranged according to the sequence of the pixel rows; the information items of the target row of pixels include: the reference coordinates corresponding to the target row of pixels arranged in sequence, and the pixel value of the target pixel;

the information of the target area includes: the base coordinates arranged in sequence and the information items of the target rows of pixels in the target area, wherein the information items of the target rows of pixels are arranged according to the sequence of the pixel rows; the information items of the target row of pixels include: the reference coordinates corresponding to the target row of pixels arranged in sequence, and the pixel value of the target pixel; and in the case that the target area includes at least one pixel other than the target pixel, the information of the target area further includes: a pixel value of the at least one pixel arranged following the information items of the target rows of pixels;

the information of the target area includes: the base coordinates arranged in sequence and the information items of the target rows of pixels in the target area, wherein the information items of the target rows of pixels are arranged according to the sequence of the pixel rows; the information items of the target row of pixels include: the reference coordinates corresponding to the target row of pixels arranged in sequence, and the pixel value of the target pixel; in the case that the target row of pixels further includes the other pixels, the information items of the target row of pixels further include: pixel values of the other pixels arranged following the pixel value of the target pixel; in the case that the target area includes other rows of pixels than the target row of pixels, the information of the target area further includes information items of the other rows of pixels, wherein the information items of the other rows of pixels include: pixel values of the pixels in the other rows of pixels; and the information items of the other rows of pixels are arranged following the information items of the target rows of pixels;

the information of the target area includes: the base coordinates arranged in sequence and the information items of the target rows of pixels in the target area, wherein the information items of the target rows of pixels are arranged according to the sequence of the pixel rows; the information items of the target row of pixels include: the reference coordinates corresponding to the target row of pixels arranged in sequence, and the pixel value of the target pixel; in the case that the target row of pixels further includes the other pixels, the information items of the target row of pixels further include: the pixel values of the other pixels arranged following the pixel value of the target pixel; in the case that the target area includes the other rows of pixels than the target row of pixels, the information of the target area further includes the information items of the other rows of pixels, wherein the information items of the other rows of pixels include: the pixel values of the pixels in the other rows of pixels; and the information items of the rows of pixels in the target area are arranged according to the sequence of the pixel rows;

the information of the target area includes: the base coordinates arranged in sequence, the reference coordinates corresponding to the target rows of pixels, and the pixel values of the target pixel in the target rows of pixels; the reference coordinates corresponding to the target rows of pixels are arranged according to the sequence of the pixel rows, and the pixel values of the target pixels in the target rows of pixels are arranged according to the sequence of the pixel rows; and the information of the target area includes: the base coordinates arranged in sequence, the reference coordinates corresponding to the target rows of pixels, and the pixel value of the target pixel in the target rows of pixels; the reference coordinates corresponding to the target rows of pixels are arranged according to the sequence of the pixel rows, and the pixel values of the target pixels in the target rows of pixels are arranged according to the sequence of the pixel rows; in the case that the target area includes at least one pixel other than the target pixel, the information of the target area further includes: the pixel value of the at least one pixel arranged following the pixel values of the target pixel in the target rows of pixels.

In a second aspect of the embodiments of the present disclosure, a method for transmitting information is provided. The method is applicable to a display device. The method includes:

receiving display information from a processing device, wherein the display information includes information of a target area; and displaying the target area based on the information of the target area;

wherein the target area is a partial pixel area of the target image, the target area includes pixels with transparencies less than 1, and transparencies of pixels outside the target area in the target image are all 1.

In some embodiments, the information of the target area includes: base coordinates of any pixel in the target area in the target image, reference coordinates corresponding to a target row of pixels in the target area, and a pixel value of a target pixel in the target row of pixels; the target row of pixels includes P target pixels, and in the case that P is greater than 1, the P target pixels are contiguous; a transparency of an edge target pixel along the P target pixels along a pixel row direction is less than 1; in the case that the target row of pixels includes other pixels than the P target pixels, transparencies of the other pixels are equal to 1; and the reference coordinates corresponding to the target row of pixels are configured to indicate: coordinates of the target pixel in the target row of pixels relative to the base coordinate;

displaying the target area based on the information of the target area includes:
  determining the coordinates of the target pixel in the target image based on the base coordinates and the reference coordinates corresponding to the target row of pixels;
  determining, according to a resolution of the target area, the base coordinates, the coordinates of the target pixel in the target image, and the pixel value in the information of the target area, the coordinates and pixel values of the pixels in the target area in the target image; and
  displaying, according to the coordinates and pixel values of the pixels in the target image, the target area.

In some embodiments, upon receiving the display information from the processing device, the method further includes:
  displaying, in the case that the target image is an $(N+1)^{th}$ frame image, and a non-overlapping area is present between a target area in an $N^{th}$ frame image and a target area in the $(N+1)^{th}$ frame image, the non-overlapping area, wherein transparencies of pixels in the non-overlapping area are all 1, and N is greater than or equal to 1.

In a third aspect of the embodiments of the present disclosure, a system for transmitting information is provided. The system includes: a processing device and a display device; wherein
  the processing device is configured to: acquire a target image of the display device; determine a target area in the target image; and send display information to the display device, wherein the display information includes information of the target area; wherein the target area is a partial pixel area of the target image, the target area includes pixels with transparencies less than 1, and transparencies of pixels outside the target area in the target image are all 1; and
  the display device is configured to: receive the display information from the processing device, wherein the display information includes the information of the target area; and display the target area based on the information of the target area.

In a fourth aspect of the embodiments of the present disclosure, a non-transitory computer-readable storage medium is provided. The non-transitory computer-readable storage medium stores a computer program including one or more instructions. The computer program, when loaded and run by a processor of an electronic device, causes the electronic device to perform the method for transmitting information according to the first aspect.

In a fifth aspect of the embodiments of the present disclosure, a non-transitory computer-readable storage medium is provided. The non-transitory computer-readable storage medium stores a computer program including one or more instructions. The computer program, when loaded and run by a processor of an electronic device, causes the electronic device to perform the method for transmitting information according to the second aspect.

In a sixth aspect of the embodiments of the present disclosure, an electronic device is provided. The electronic device includes: a processor, a memory, and a bus. The memory stores one or more machine-readable instructions executable by the processor. In response to the electronic device operating, the processor communicates with the memory via the bus. The one or more machine-readable instructions, when loaded and executed by the processor, cause the processor to perform the method for transmitting information according to the first aspect.

In a seventh aspect, an electronic device is provided. The electronic device includes: a processor, a memory, and a bus. The memory stores one or more machine-readable instructions executable by the processor. In response to the electronic device operating, the processor communicates with the memory via the bus. The one or more machine-readable instructions, when loaded and executed by the processor, cause the processor to perform the method for transmitting information according to the second aspect.

DETAILED DESCRIPTION

For clearer and more complete descriptions of the principles, technical solutions, and advantages of the present disclosure, the technical solutions of the present disclosure are described clearly hereinafter in combination with the accompanying drawings. It is obvious that the described embodiments are merely part but not all of the embodiments of the present disclosure. All other embodiments acquired by those skilled in the art without creative efforts based on the embodiments in the present disclosure are within the protection scope of the present disclosure.

Unless otherwise defined, technical terms or scientific terms used the present disclosure shall have ordinary meaning understood by persons of ordinary skill in the art to which the present disclosure belongs. The terms "first," "second," and the like used in the present disclosure are not intended to indicate any order, quantity, or importance, but are merely used to distinguish different components. The terms "include," "comprise," and derivatives thereof are used to indicate that the term preceding the word cover the terms or equivalents described following the word, and shall not be understood as excluding other terms. The terms "connection" and the like are not intended to be limited to physical or mechanical connection, but may include electrical connections, either direct or indirect connection.

In order to keep the following illustration of the present disclosure clear and concise, the present disclosure omits detailed descriptions for known functions and known components.

In the process of realizing display of AR, a processing device sends information of a target image to a display device. A resolution of the target image is consistent with a resolution of the display device. The information of the target image includes coordinates and pixels value of the pixels in the target image. As a result, the information sent to the display device from the processing device is more, resulting in a lower information transmission efficiency, a sense of jaggedness in the image displayed by the display device, and a poor image display effect.

Figure 1:
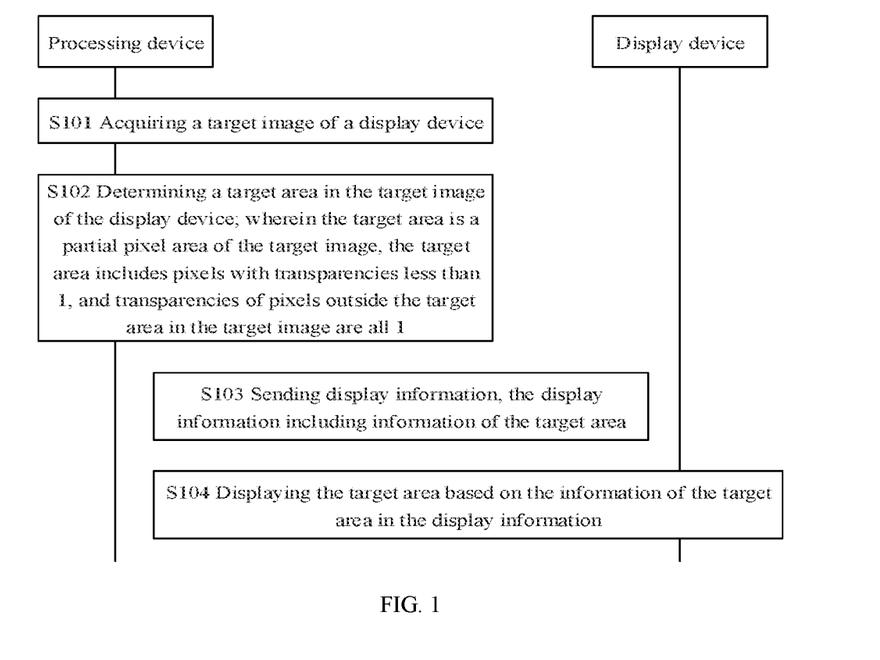
FIG. 1 is a flowchart of a method for transmitting information according to the present disclosure.

The present disclosure provides a method for transmitting information, which can improve the efficiency of information transmission between the processing device and the display device. Exemplarily, FIG. 1 is a flowchart showing a method for transmitting information, which includes S101 to S104. The method includes the following processes.

In S101, the processing device acquires the target image of the display device.

The processing device is connected to the display device. The processing device may be any device with a processing function, such as a computer, a server and a terminal; and the display device may be any device that can display the image, such as a VR display device.

The image required to be displayed by the display device is provided by the processing device for the display device. Therefore, before the display device displays the image, the processing device needs to acquire the image required to be displayed by the display device. Moreover, the processing device usually acquires a next frame image at a same moment that the display device displays a current frame image, and the next frame image acquired by the processing device is the target image by the display device.

There are many ways for the processing device to acquire the target image. For example, the processing device may acquire the target image by rendering, or the processing device may acquire the target image by receiving the target image from another device, which is not limited in the embodiment of the present disclosure.

In addition, since the target image is an image for the display device to display, the resolution of the target image is the same as the resolution of the display device.

In S102, the processing device determines a target area in the target image of the display device; wherein the target area is a partial pixel area of the target image, the target area includes pixels with transparencies less than 1, and transparencies of the pixels located outside the target area in the target image are all 1.

The pixels with transparencies less than 1 in the target image are the pixels of a target to be displayed in the target image, and the target area where these pixels are located is also the area where the pixels of the target to be displayed are located. The target to be displayed is an object required to be displayed by the display device to a user, for example, some scenes, a certain object, and so on. The transparencies of the pixels outside the target area in the target image are 1, and these pixels are called black pixels or transparent pixels.

It should be noted that the target image may include one target area or a plurality of target areas. In the case that the target image includes the plurality of target areas, each of the plurality of target areas includes the pixels with transparencies less than 1, and the transparencies of the pixels outside the plurality of target areas in the target image are all 1. Each target area in the plurality of target areas includes the pixels of one target to be displayed.

In the case that the processing device determines the target area in the target image, the processing device may firstly determine the pixels of the target to be displayed in the target image, and then determine the target area according to the pixels of the target to be displayed.

In some embodiments, the pixels in the target image may include a transparency channel (also called an alpha channel), and the transparency channel is configured to indicate the transparency of the pixel. The processing device may determine the pixel of the target to be displayed in the target image according to the transparency channels of the pixel.

In some embodiments, in the case that a value of the transparency channel of a pixel is 1, the transparency of the pixel is less than 1 (that is, less than 100%), that is, the pixel is not the transparent pixel; and in the case that the value of the transparency channel of a pixel is 0, the transparency of the pixel is 1 (that is, 100%), that is, the pixel is the transparent pixel. The processing device may determine that the pixels of which the values of the transparency channels are not 0 (that is, the pixels of which the transparencies are less than 1) in the target image are the pixels of the target to be displayed.

In some embodiments, the case that the processing device determines the pixels of the target to be displayed according to the transparency channels of the pixels is taken as an example for illustration. In some embodiments, the processing device may further determine the pixels of the target to be displayed in other ways (for example, a depth template method, or the like), which is not limited in the embodiments of the present disclosure.

Further, in response to determining the pixels of the target to be displayed in the target image, the processing device may determine the target area according to the pixels.

In some embodiments, the transparency of at least one edge pixel of the pixels in the target area is less than 1. Therefore, the at least one edge pixel of the pixels in the target area is the pixel of the target to be displayed. In this case, the target area includes the pixels of the target to be displayed, and no pixels of the target to be displayed is present outside the target area. Besides, the area of the target area is smaller, and the number of the pixels included in the target area is further less. The transparency of all edge pixels in the target area may be 1, which is not limited in the embodiments of the present disclosure.

In some embodiments, the target area may be an area with a fixed shape, for example, a rectangular area (a square area or a rectangular area), a circular area, etc.

Figure 2:
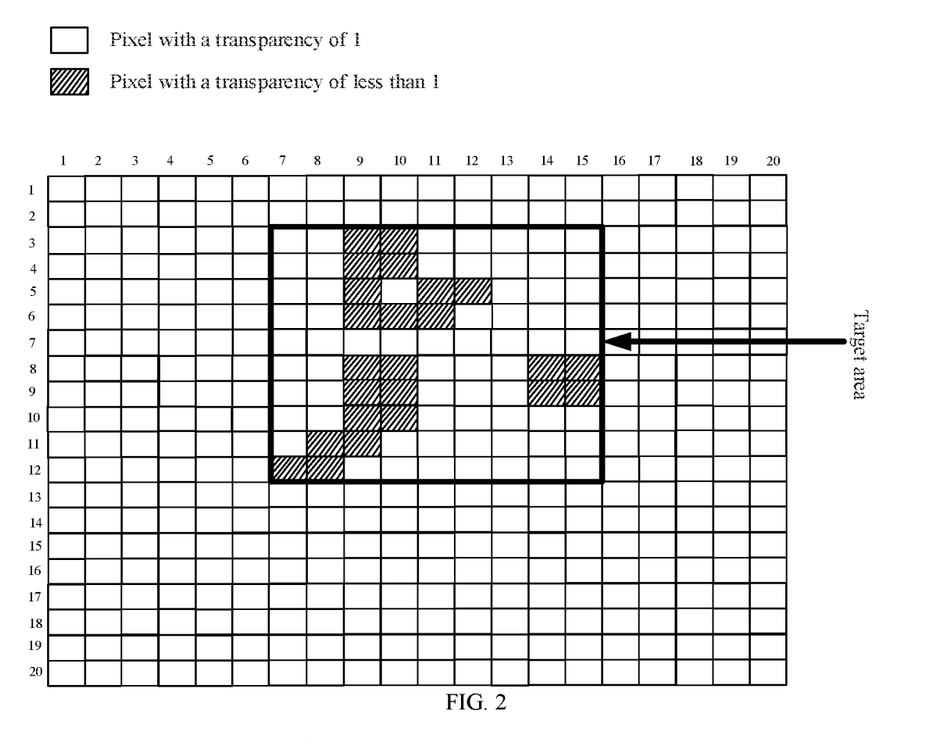
FIG. 2 is a schematic diagram of a target image according to the present disclosure.

In some embodiments, the target area is the rectangular area. The processing device may determine that a circumscribed rectangular area of the pixels of the target to be displayed in the target image is the target area. In this case, the transparency of at least one edge pixel of the pixels in the target area is less than 1. Assuming that the target image is as shown in FIG. 2, then the processing device may determine that in the third to twelfth rows of pixels in the target image, the area where the seventh to fifteenth columns of pixels are located is the target area.

The resolution of the target area may be a fixed resolution, and may also be a resolution changing with the target image, which is not limited in the embodiments of the present disclosure.

In S103, the processing device sends display information to the display device, and the display information includes information of the target area.

The information of the target area is configured to indicate coordinates of the pixels in the target area in the target image, and pixel values of the pixels. The information of the target area may be implemented in multiple ways, two of which will be taken as examples for illustration as follows.

In some embodiments, the information of the target area includes: the coordinates of the pixels in the target area in the target image, and the pixel values of the pixels. In this implementation, the processing device may directly acquire the coordinates and the pixel values of the pixels in the target area in the target image to acquire the information of the target area, and send the information to the display device, such that the display device displays the target area based on the information.

In some embodiments, the information of the target area includes: base coordinates of any pixel in the target area in the target image, reference coordinates corresponding to a target row of pixels in the target area, and a pixel value of a target pixel in the target row of pixels.

It should be noted that the base coordinates are the coordinates of any pixel in the target area in the target image, and the any pixel may be a pixel at any position in the target area. For example, in the case that the target area is a rectangular area, the any pixel may be a pixel located at a center point or a vertex (for example, the vertex at the upper left corner) in the target area. The coordinates of the pixel in the target image are configured to indicate the position of the pixel in the target image.

The target area includes a plurality of rows of pixels, and the plurality of rows of pixels includes at least one target row of pixels. The target row of pixels includes P target pixels, and in the case that P is greater than 1, the P target pixels are contiguous; the transparency of an edge target pixel in the P target pixels along a pixel row direction is less than 1; and in the case that the target row of pixels includes other pixels than the P target pixels, the transparencies of other pixels are equal to 1.

Figure 3:
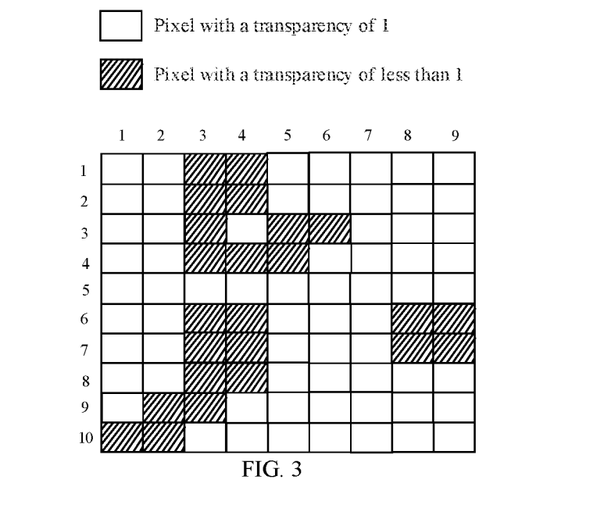
FIG. 3 is a schematic diagram of a target area in a target image according to the present disclosure.

FIG. 3 is a schematic diagram of the target area in FIG. 2 according to an embodiment of the present disclosure. As shown in FIG. 3, the target area includes 10 rows and 9 columns of pixels. The transparencies of the fifth row of pixels are 1. Therefore, the fifth row of pixels is not the target row of pixels. The first to fourth rows of pixels, and the sixth to tenth rows of pixels include the pixels with the transparencies less than 1, such that the rows of pixels in the first to fourth rows of pixels, and the sixth to tenth rows of pixels are the target row of pixels.

The P target pixels in the first row of pixels are: pixels in the third and fourth columns. The P target pixels in the second row of pixels are: pixels in the third and fourth columns. The P target pixels in the third row of pixels are: pixels in the third, fourth, fifth, and sixth columns. The P target pixels in the fourth row of pixels are: pixels in the third, fourth, and fifth columns. The P target pixels in the sixth row of pixels are: pixels in the third, fourth, fifth, sixth, seventh, eighth and ninth columns. The P target pixels in the seventh row of pixels are: pixels in the third, fourth, fifth, sixth, seventh, eighth and ninth columns. The P target pixels in the eighth row of pixels are: pixels in the third and fourth columns. The P target pixels in the ninth row of pixels are: pixels in the second and third columns. The P target pixels in the tenth row of pixels are: pixels in the first and second columns.

For the reference coordinates corresponding to the target row of pixels in the information of the target area, the base coordinates are configured to indicate the coordinates of the target pixel in the target row of pixels relative to the reference coordinates.

In some embodiments, the reference coordinates corresponding to the target row of pixels include: the coordinates of the edge target pixel in the target row of pixels relative to the base coordinates. In this way, the amount of information of the reference coordinates corresponding to the target row of pixels is less, which further reduces the amount of information transmitted between the processing device and the display device.

In some embodiments, assuming that the base coordinates are coordinates (3, 7) of the pixel in the first row and first column in FIG. 3 in the target image in FIG. 2, then for the fourth row of pixels in FIG. 3 (the target row of pixels), the reference coordinates corresponding to the fourth row of pixels include: the coordinates (6, 9)−(3, 7)+(1, 1)=(4, 3) of the pixel (the edge target pixel) in the third column in the fourth row of pixels relative to the base coordinates (3, 7), and the coordinates (6, 11)−(3, 7)+(1, 1)=(4, 5) of the pixel (the edge target pixel) in the fifth column in the fourth row of pixels relative to the base coordinates (3, 7).

In some embodiments, the reference coordinates corresponding to the target row of pixels may further include: the coordinates of the target pixels in the target row of pixels relative to the base coordinate, which is not limited in the embodiment of the present disclosure.

For the coordinates in the display information, the coordinates may be represented in a binary (that is, coordinates binarization), decimal, or hexadecimal format, or the like. Assuming that the coordinates are represented in the binary format, then where the resolution of the target image is 720*720 (the target image includes 720 rows and 720 columns of pixels), 10 bits may represent all the row number and column number of the target image, and 20 bits may represent the coordinates of one pixel.

Further, in the case that the target row of pixels further includes other pixels than the target pixel, the information of the target area may further include: pixel values of the other pixels. In the case that the target area includes other rows of pixels than the target row of pixels, the information of the target area may further include: the pixel values of the pixels in the other rows of pixels. Of course, the information of the target area may not include the pixel values of the other pixels and the pixel values of other rows pixels, which is not limited in the embodiments of the present disclosure.

In addition, in the case that the resolution of the target area is not fixed, the information of the target area may further include resolution information of the target area, such that the display device can determine the resolution according to the resolution information. In the case that the resolution of the target area is fixed, the information of the target area may not include the resolution information of the target area.

According to the above content, the display information from the processing device to the display device is not the information of all pixels in the target image. Therefore, the amount of the display information is smaller, which greatly improves the transmission efficiency of the display information and reduces a bandwidth required to transmit the display information.

In S104, the display device displays the target area based on the information of the target area in the display information.

In response to receiving the display information, the display device may display the target area based on the information in the target area in the display information.

In one aspect, in the case that the information of the target area includes the coordinates and pixel values of the pixels in the target area in the target image, the display device may display the pixels in the target area according to the coordinates and pixel values of the pixels in the target area, so as to achieve the display of the target area.

In another aspect, in the case that the information of the target area includes: the base coordinates of any pixel in the target area in the target image, the reference coordinates corresponding to the target row of pixels in the target area, and the pixel value of the target pixel in the target row of pixels, the display device determines the coordinates and pixel values of the pixel in the target area in the target image based on the information, and then display the target area according to the coordinates and pixel values.

In some embodiments, the fixed resolution of the target area is taken as an example. In the case that the display device determines the coordinates and pixel values of the pixels in the target area in the target image based on the information of the target area, the display device may determine the coordinates of the target pixel in the target image according to the base coordinates and the reference coordinates corresponding to the target row of pixels. The display device may determine the coordinates and pixel values of the pixels in the target area in the target image according to the resolution of the target area, the base coordinates, the coordinates of the target pixel in the target image, and the pixel values in the information of the target area.

In some embodiments, assuming that the base coordinates are the coordinates (3, 7) of the pixel in the first row and the first column in FIG. 3 in the target image in FIG. 2, then for the fourth row of pixels in FIG. 3 (the target row of pixels), the reference coordinates corresponding to the fourth row of pixels include: the coordinates (4, 3) of the pixel (the edge target pixel) in the third column in the fourth row of pixels relative to the base coordinates (3, 7), and the coordinates (4, 5) of the pixel (the edge target pixel) in the fifth column in the fourth row of pixels relative to the base coordinates (3, 7). Then, the display device may determine the coordinates of the target pixels in the fourth row of pixels in the target image according to the base coordinates (3, 7), the coordinates (4, 3), and (4, 5). For example, the display device determines that the coordinates of the pixel in the third column in the fourth row of pixels in the target image is (6, 9), the coordinates of the pixel in the fourth column in the fourth row of pixels in the target image is (6, 10), and the coordinates of the pixel in the fifth column in the fourth row of pixels in the target image is (6, 11). Afterwards, the display device reads the pixel value of the target pixel from the information of the target area to acquire the coordinates and pixel value of the target pixel in the target image.

The display device may further determine the coordinates of the pixels in the target area in the target image according to the resolution and base coordinates of the target area. Afterwards, the display device determines the coordinates of a non-target pixel in the target area in the target image according to the coordinates of the pixels in the target area in the target image and the coordinates of the target pixel in the target image.

Next, where the information of the target area includes a pixel value of the non-target pixel, the display device may directly read the pixel value of the non-target pixel to acquire the coordinates and pixel value of the non-target pixel in the target image. Where the information of the target area does not include the pixel value of the non-target pixel, because the transparency of the non-target pixel is 1 and the pixel value of the non-target pixel is a default value, the display device may generate the pixel value of the non-target pixel.

In this way, the display device acquires the coordinates and pixel values of the pixels in the target area in the target image.

It should be noted that the pixel values in the display information are arranged according to a certain sequence. In the case of reading the pixel value from the display information, the display device may determine the pixel to which the pixel value belongs according to the arrangement sequence of the pixel values. In other words, the information in the display information from the processing device is arranged according to a certain sequence, and in response to receiving the display information, the display device may parse the display information according to the sequence to acquire the information in the display information.

In the above embodiments, the fixed resolution of the target area is taken as an example. In the case that the resolution of the target area is not fixed, the information of the target area further includes the resolution information of the target area. In this case, the display device may determine the resolution of the target area based on the information, and then determines the coordinates and pixel values of the pixels in the target area in the target image according to the resolution.

In summary, in the method for transmitting information according to the embodiments of the present disclosure, the display information from the processing device to the display device does not include the information of all pixels of the target image. Therefore, the amount of the display information is smaller, which greatly improves the transmission efficiency of the display information, and reduces a bandwidth required to transmit the display information. In addition, as the transmission efficiency of the information is improved, the image displayed by the display device does not have the sense of jaggedness, and the image display effect is better.

In addition, in the case of displaying the target image, the display device may display the target area based on the information of the target area without displaying all the images to be displayed. Therefore, the display device does not need to scan all pixels of the display device line by line (for example, the display device may scan only a part of rows and/or a part of columns of pixels), which reduces power consumption of the display device and improves the display efficiency.

Further, in the case that the information of the target area in the above display information includes: the base coordinates of any pixel in the target area in the target image, the reference coordinates corresponding to the target row of pixels in the target area, and the pixel value of the target pixel in the target row of pixels, the arrangement of the information in the information of the target area may be varied. The following will take the following several arrangements as examples to explain.

Arrangement 1

Figure 4:
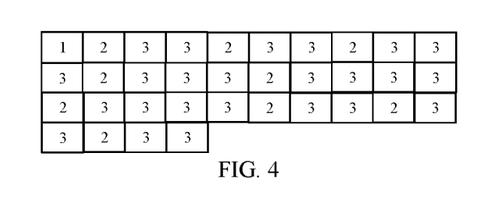
FIG. 4 is a schematic diagram of information of a target area according to the present disclosure.

The information of the target area includes: the base coordinates arranged in sequence, and information of target rows of pixels in the target area, wherein the information items of the target rows of pixels are arranged according to a sequence of the pixel rows; the information items of the target row of pixels include: the reference coordinates corresponding to the target row of pixels arranged in sequence and the pixel value of the target pixel; in this case, the information of the target area may not include the pixel values of other pixels in the target row of pixels than the target pixel, and the information of other rows of pixels in the target area than the target row of pixels.

In response to acquiring various information in the information of the target area, the processing device may arrange the base coordinates most front, and then place the information items of the target rows of pixels following the base coordinates according to the sequence of the pixel rows to acquire the information of the target area.

Illustratively, FIG. 4 shows a schematic diagram of the information of the target area arranged in Arrangement 1, 1 indicates the base coordinate, 2 indicates the reference coordinates corresponding to the target row of pixels, and 3 indicates the pixel value of the target pixel in the target row of pixels.

It can be seen that the information of the target area includes: the base coordinate, the information of the first target row of pixels, the information of the second target row of pixels, the information of the third target row of pixels . . . , and the information of last target row of pixels. It should be noted that, whether the target row of pixels includes other pixels than the target pixel, the information items of the target row of pixels merely include: the reference coordinates corresponding to the target row of pixels arranged in sequence, and the pixel value of the target pixels in the target row of pixels: The pixel values of the target pixels in each target row of pixels may be arranged according to the sequence of pixel columns.

Arrangement 2

Figure 5:
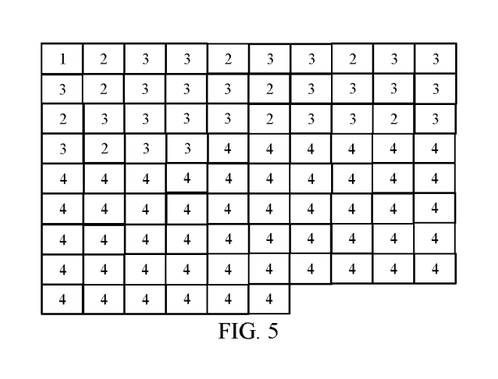
FIG. 5 is a schematic diagram of information of another target area according to the present disclosure.

On the basis of Arrangement 1, in the case that the target area includes at least one pixel other than the target pixel, the information of the target area further includes: the pixel value of the at least one pixel arranged following the information items of the target rows of pixels.

In response to acquiring various information in the information of the target area, the processing device may arrange the base coordinates most front, and then place the information items of the target rows of pixels following the base coordinates according to the sequence of the pixel rows, and place the information of the above at least one pixel following the information of all the target rows of pixels to acquire the information of the target area.

Illustratively, FIG. 5 shows a schematic diagram of the information of the target area arranged in Arrangement 2, 1 indicates the base coordinate, 2 indicates the reference coordinates corresponding to the target row of pixels, 3 indicates the pixel value of the target pixel of the target row of pixels, and 4 indicates the pixel value of at least one pixel other than the target pixel (called the non-target pixel, that is, other rows of pixels and other pixels in the target row of pixels).

It can be seen that the information of the target area includes: the base coordinate, the information of the first target row of pixels, the information of the second target row of pixels, the information of the third target row of pixels . . . , the information of the last target row of pixels, the pixel value of the first non-target pixel, the pixel value of the second non-target pixel . . . , and the pixel value of the last non-target pixel. The at least one pixel may be arranged according to the sequence of the pixel rows and columns.

Arrangement 3

Figure 6:
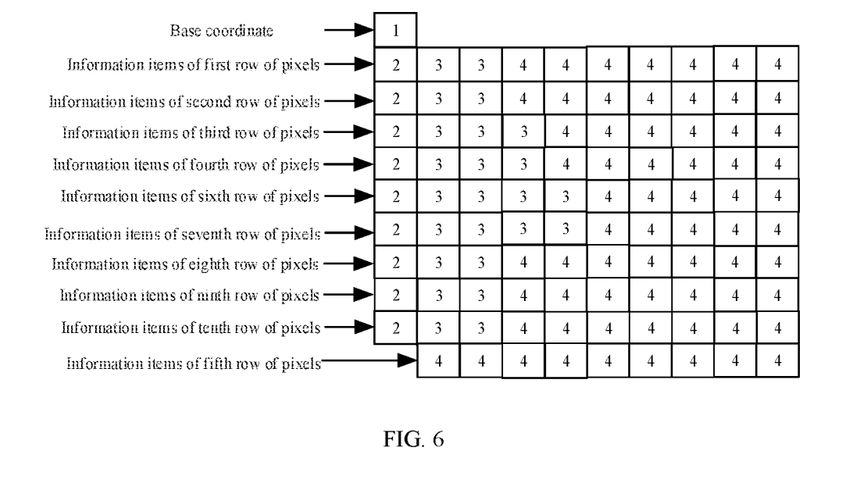
FIG. 6 is a schematic diagram of information of still another target area according to the present disclosure.

On the basis of Arrangement 1, in the case that the target row of pixels further includes other pixels, the information items of the target row of pixels further include: the pixel values of other pixels arranged following the pixel value of the target pixel; in the case that the target area includes other rows of pixels than the target row of pixels, the information of the target area further includes the information of other rows of pixels. The information of other rows of pixels includes: the pixel value of each pixel in the other rows of pixels; and the information items of the other rows of pixels are arranged following the information items of the target rows of pixels.

In response to acquiring various information in the information of the target area, the processing device may arrange the base coordinates most front, and then place the information items of the target rows of pixels following the base coordinates according to the sequence of the pixel rows, and place the information items of the other rows of pixels following the information of all the target rows of pixels according to the sequence of the pixel rows to acquire the information of the target area.

Illustratively, FIG. 6 shows a schematic diagram of the information of the target area arranged in Arrangement 3, 1 indicates the base coordinate, 2 indicates the reference coordinates corresponding to the target row of pixels, 3 indicates the pixel value of the target pixel in the target row of pixels, and 4 indicates the pixel value of other row of pixels and other pixel in the target row of pixels.

It can be seen that the information of the target area includes: the base coordinate, the information of the first target row of pixels, the information of the second target row of pixels, the information of the third target row of pixels . . . , the information of the last target row of pixels, the information of the first of other rows of pixels and the information of the last of other rows of pixels. The pixel values of the pixels in the information of each row of pixels max be arranged according to the sequence of the pixel columns.

Arrangement 4

Figure 7:
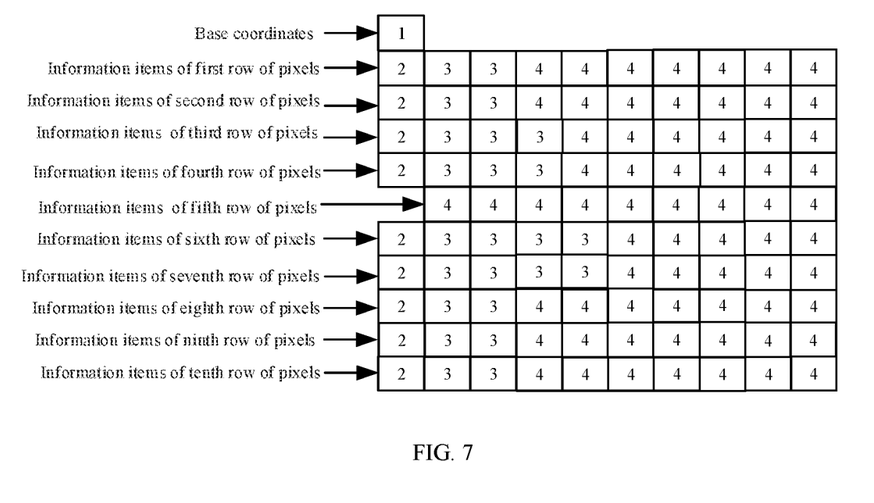
FIG. 7 is a schematic diagram of information of yet still another target area according to the present disclosure.

On the basis of Arrangement 3, the information of other rows of pixels is not arranged following the information of each target row of pixels, but the information of each row of pixels in the information of the target area is arranged according to the sequence of the pixel rows.

In response to acquiring various information in the information of the target area, the processing device may arrange the base coordinates most front, and then place the information of the rows of pixels following the base coordinates according to the sequence of the pixel rows to acquire the information of the target area.

Illustratively, FIG. 7 shows a schematic diagram of the information of the target area arranged in Arrangement 4, 1 indicates the base coordinate, 2 indicates the reference coordinates corresponding to the target row of pixels, 3 indicates the pixel value of the target pixel in the target row of pixels, and 4 indicates the pixel value of other row of pixels and other pixel in the target row of pixels.

It can be seen that the information of the target area includes: the base coordinates, the information of the first row of pixels, the information of the second row of pixels, the information of the third row of pixels . . . , and the information of the last row of pixels. It should be noted that, (1) where a certain row of pixels is not the target row of pixels, the information of the row of pixels merely includes the pixel values of the pixels (each black pixel with a transparency 1) in the row of pixels; (2) where a certain row of pixels is the target row of pixels, and the row of pixels merely includes the target pixels, the information of the row of pixels includes: the reference coordinates corresponding to the row of pixels arranged in sequence, and the pixel values of the target pixels in the row of pixels; and (3) where a certain row of pixels is the target row of pixels, and the row of pixels includes not only the target pixel, but also other pixels than the target pixel, the information of the row of pixels includes: the reference coordinates corresponding to the row of pixels arranged in sequence, the pixel values of the target pixels in the row of pixels, and the pixel values of other pixels in the row of pixels.

Arrangement 5

Figure 8:
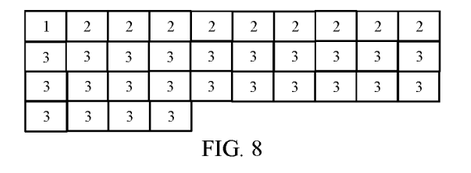
FIG. 8 is a schematic diagram of information of yet still another target area according to the present disclosure.

The information of the target area includes: the base coordinates arranged in sequence, the reference coordinates corresponding to the target rows of pixels, and the pixel value of the target pixel in each target row of pixels; the reference coordinates corresponding to the target rows of pixels are arranged according to the sequence of the pixel rows, and the pixel values of the target pixels in each target row of pixels is arranged according to the sequence of the pixel rows.

In response to acquiring various information in the information of the target area, the processing device may arrange the base coordinates most front, and then place the reference coordinates corresponding to the target rows of pixels following the base coordinates according to the sequence of the pixel rows, and place the pixel values of the target pixels in the target rows of pixels following all the base coordinates according to the sequence of the pixel rows to acquire the information of the target area.

Illustratively, FIG. 8 shows a schematic diagram of the information of the target area arranged in Arrangement 5, 1 indicates the base coordinate, 2 indicates the reference coordinates corresponding to the target row of pixels, and 3 indicates the pixel value of the target pixel in the target row of pixels.

It can be seen that the information of the target area includes: the base coordinates, the reference coordinates corresponding to the first target row of pixels, the reference coordinates corresponding to the second target row of pixels, the reference coordinates corresponding to the third target row of pixels . . . , the reference coordinates corresponding to the last target row of pixels, the pixel value of the target pixel in the first target row of pixels, the pixel value of the target pixel in the second target row of pixels, the pixel value of the target pixel in the third target row of pixels . . . , and the pixel value of the target pixel in the last target row of pixels. The pixel values of the pixels in the information items of the target row of pixels may be arranged according to the sequence of the pixel columns.

Arrangement 6

Figure 9:
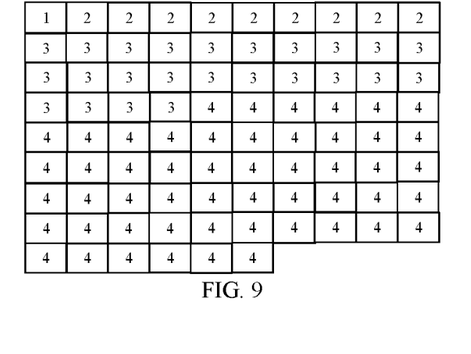
FIG. 9 is a schematic diagram of information of yet still another target area according to the present disclosure.

On the basis of Arrangement 5, in the case that the target area includes at least one pixel other than the target pixel, the information of the target area further includes: the pixel value of at least one pixel value arranged following the pixel values of the target pixels in the target rows of pixels.

In response to acquiring various information in the information of the target area, the processing device may arrange the base coordinates most front, and then place the reference coordinates corresponding to the target rows of pixels following the base coordinates according to the sequence of the pixel rows, place the pixel values of the target pixels in the target rows of pixels following all the base coordinates according to the sequence of the pixel rows, and place the pixel value of the at least one pixel following the pixel values of all the target pixels to acquire the information of the target area.

Illustratively, FIG. 9 shows a schematic diagram of the information of the target area arranged in Arrangement 6, 1 indicates the base coordinate, 2 indicates the reference coordinates corresponding to the target row of pixels, 3 indicates the pixel value of the target pixel in the target row of pixels, and 4 indicates the pixel value of the at least one pixel (other rows of pixels and other pixels in the target row of pixels, also called the non-target pixel) other than the target pixel.

It can be seen that the information of the target area includes: the base coordinates, the reference coordinates corresponding to the first target row of pixels, the reference coordinates corresponding to the second target row of pixels, the reference coordinates corresponding to the third target row of pixels . . . , the reference coordinates corresponding to the last target row of pixels, the pixel value of the target pixel in the first target row of pixels, the pixel value of the target pixel in the second target row of pixels, the pixel value of the target pixel in the third target row of pixels . . . , the pixel value of the target pixel in the last target row of pixels, the pixel value of the first non-target pixel, the pixel value of the second non-target pixel . . . , and the pixel value of the last non-target pixel. The at least one pixel may be arranged according to the sequence of the pixel rows and columns.

It is noted that in the above various arrangements, the base coordinates may further be arranged in other positions of the display information, for example, the base coordinates are arranged following the reference coordinates corresponding to the last row of pixels, or the base coordinates are arranged at the end of the display information, etc. Where the display information includes the resolution information of the target area, the resolution information of the target area may be arranged at any position, for example, arranged before or following the base coordinate, which is not limited in the embodiments of the present disclosure.

Further, the target image in the above embodiments may be any one of several contiguous frame images. Each frame image includes the target area, and the processing device may send the display information of a plurality of frame images to the display device in sequence (the display information of each frame image includes the information of the target area in the frame image), such that the display device displays the target areas of the plurality of frame images in sequence.

The $N^{th}$ frame image is the previous frame image of the $(N+1)^{th}$ frame image, and the target area in the $N^{th}$ frame image is displayed before the target area in the $(N+1)^{th}$ frame image. In the case that the processing device sends the display information of the $(N+1)^{th}$ frame image to the display device, the display device is displaying the target area in the $N^{th}$ frame image.

In the case that the target area in the $N^{th}$ frame image overlaps with the target area in the $(N+1)^{th}$ frame image, and the display device displays the target area in the $(N+1)^{th}$ frame image, the target area in the $N^{th}$ frame image will not be displayed. However, in the case that a non-overlapping area is present between a target area in the $N^{th}$ frame image and a target area in the $(N+1)^{th}$ frame image, and the display device displays the target area in the $(N+1)^{th}$ frame image, the non-overlapping area in the target area of the $N^{th}$ frame image will still be displayed.

In order to prevent the display device from displaying the non-overlapping area in the target area in the $N^{th}$ frame image in the case of displaying the target area in the $(N+1)^{th}$ frame image, the processing device needs to add a target indication in display information of the $(N+1)^{th}$ frame image in the case that the non-overlapping area exists, and the target indication is configured to indicate that the transparencies of pixels in the non-overlapping area are all 1. In this way, in the case that the display device displays the target area in the $(N+1)^{th}$ frame image, the non-overlapping area may be displayed according to the target indication when the information of the target area includes the target indication, and the transparencies of the pixels in the non-overlapping area are all 1. It can be seen that although the display device displays the non-overlapping area, the transparencies of the pixels in the non-overlapping area are 1, which is equivalent to that the target area in the $N^{th}$ frame image is not displayed.

The target indication may be practiced in a plurality of fashions. The target indication is hereinafter described using one optional fashion as an example.

Assuming that the target area is a rectangular area, then the non-overlapping area may be a rectangular area or an area formed by splicing two rectangular areas.

In the case that the non-overlapping area is the rectangular area (called the first rectangular area), the target indication may include: the coordinates of pixels at two vertices of any diagonal of the first rectangular area in the target image (the $(N+1)^{th}$ frame image). In this way, the display device may determine the non-overlapping area according to the coordinates of the two vertices in the target image, and then determine that the transparencies of the pixels in the non-overlapping area are all 1.

Figure 10:
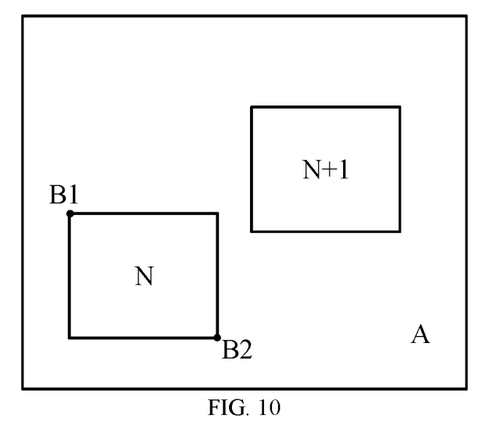
FIG. 10 is a schematic diagram of a non-overlapping area according to the present disclosure.

Illustratively, as shown in FIG. 10, a screen area of the display device is area A, the target area in the $N^{th}$ frame image is area N, and the target area in the $(N+1)^{th}$ frame image is area N+1. In the case shown in FIG. 10, the target area N of the $N^{th}$ frame image is the non-overlapping area. In this case, the target indication in the display information of the $(N+1)^{th}$ frame image includes: the coordinates of two vertices (B1 and B2) in the target area N of the $N^{th}$ frame image in the $(N+1)^{th}$ frame image. The display device may replace the pixels in the area N with black pixels (also called transparent pixels, that is, the pixels with transparencies 1) and display the pixels in the area N+1 simultaneously according to the target indication.

Figure 11:
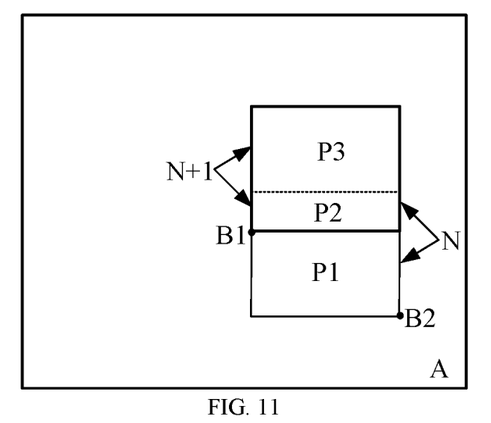
FIG. 11 is a schematic diagram of another non-overlapping area according to the present disclosure.
Figure 12:
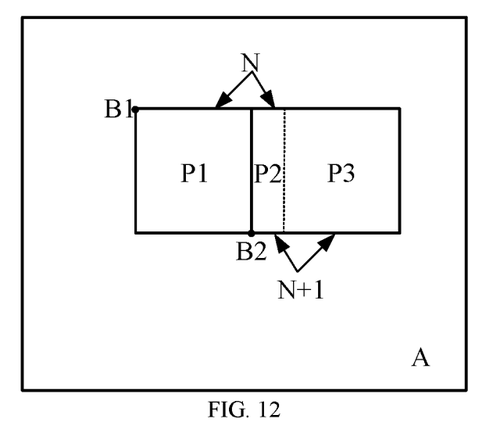
FIG. 12 is a schematic diagram of still another non-overlapping area according to the present disclosure.

Illustratively, as shown in FIG. 11 or FIG. 12, the screen area of the display device is area A, the target area in the $N^{th}$ frame image is area N (including area P1 and area P2), and the target area in the $(N+1)^{th}$ frame image is area N+1 (including area P2 and area P3). The area P1 in the target area N of the $N^{th}$ frame image is the non-overlapping area. In this case, the target indication in the display information of the $(N+1)^{th}$ frame image includes: the coordinates of two vertices (B1 and B2) in the area P1 in the $(N+1)^{th}$ frame image. The display device may replace the pixels in the area P1 with the black pixels (also called transparent pixels, that is, the pixels with transparencies 1) and display the pixels in the area N+1 simultaneously according to the target indication.

In the case that the non-overlapping area is spliced by two rectangular areas, the target indication may include: the coordinates of the pixels at two vertices of the diagonal of each of the two rectangular areas in the target image, that is, the $(N+1)^{th}$ frame image. In this way, the display device may determine the two rectangular areas according to the coordinates, and then determine the non-overlapping area and determine that the transparencies of the pixels in the non-overlapping area are all 1.

Figure 13:
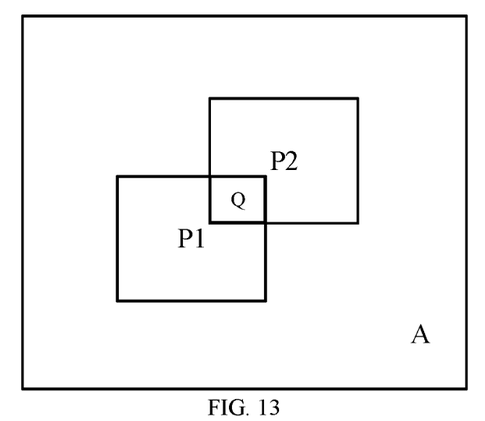
FIG. 13 is a schematic diagram of yet still another non-overlapping area according to the present disclosure.
Figure 14:
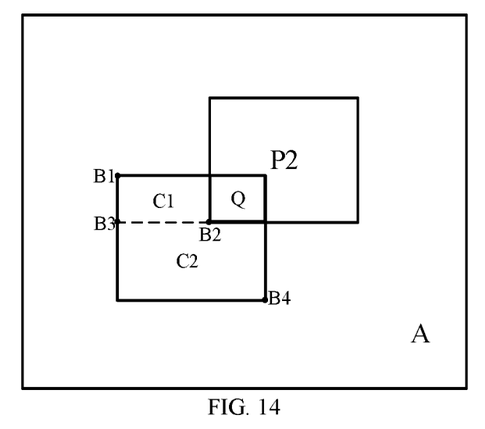
FIG. 14 is a schematic diagram of yet still another non-overlapping area according to the present disclosure.

Illustratively, as shown in FIG. 13 and FIG. 14, the screen area of the display device is area A, the target area in the $N^{th}$ frame image includes area P1 and area Q, and the target area in the $(N+1)^{th}$ frame image includes area P2 and area Q. In this case, the area P1 is the non-overlapping area, and the area P1 may include a rectangular area C1 and a rectangular area C2. The target indication in the display information of the $(N+1)^{th}$ frame image includes: the coordinates of the pixels at two vertices (B1 and B2) of a certain diagonal of the rectangular area. C1 in the $(N+1)^{th}$ frame image, and the coordinates of the pixels at two vertices (B3 and B4) of a certain diagonal of the rectangular area C2 in the $(N+1)^{th}$ frame image. The display device may replace the pixels in the area P1 with black pixels (also called transparent pixels, that is, the pixels with transparencies 1) and display the pixels in the area P2 and the area Q simultaneously according to the target indication.

The case that the processing device determines whether the target area in the $N^{th}$ frame image and the target area in the $(N+1)^{th}$ frame image include the non-overlapping area, and the target indication is added to the information of the target area in the case that the non-overlapping area exists is taken as an example above. Optionally, the processing device may not determine whether the non-overlapping area is present between the target area in the $N^{th}$ frame image and the target area in the $(N+1)^{th}$ frame image, and the target indication is not added to the information of the target area. In this case, the display device may store the display information of the frame images. In response to receiving the display information of the $(N+1)^{th}$ frame image, the display device may determine whether the non-overlapping area is present between the target area in the $N^{th}$ frame image and the target area in the $(N+1)^{th}$ frame image according to the display information of the $N^{th}$ frame image and the display information of the $(N+1)^{th}$ frame image, and display the non-overlapping area in the case that the non-overlapping area exists, and the target area in the $(N+1)^{th}$ frame image is displayed. The transparencies of the pixels in the non-overlapping area displayed by the display device is all 1.

An embodiment of the present disclosure further provides a system for transmitting information. The system includes a processing device and a display device: wherein the processing device is configured to: acquire a target image of the display device; determine a target area in the target image; and send display information to the display device, and the display information including information of the target area, wherein the target area is a partial pixel area of the target image, the target area includes pixels with transparencies less than 1, and transparencies of pixels outside the target area in the target image is all 1; and the display device is configured to: receive the display information from the processing device, and the display information includes the information of the target area; and display the target area based on the information of the target area.

Herein, operations of the processing device and the display device may refer to the corresponding operations in the embodiments of the above method for transmitting information, which is not repeated in detail in the embodiment of the present disclosure.

An embodiment of the present disclosure further provides a non-transitory storage medium. The storage medium is a computer-readable medium storing a computer program including one or more instructions. The computer program, when loaded and run by a processor of an electronic device, causes the electronic device to perform any method for a processing device or a display device according to any embodiment of the present disclosure.

Figure 15:
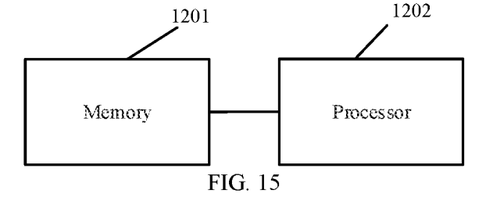
FIG. 15 is a schematic structural diagram of an electronic device according to the present disclosure.

An embodiment of the present disclosure further provides an electronic device. As shown in FIG. 15, the electronic device at least includes a memory 1201 and a processor 1202. The memory 1201 stores a computer program including one or more instructions. The processor 1202, when loading and executing the computer program on the memory 1201, causes the processor 1202 to perform any method for a processing device or a display device according to any embodiment of the present disclosure.

In some embodiments, the processing device and the display device may communicate by using any currently known or future developed network protocol, for example, an Hypertext Transfer Protocol (HTTP), and may be interconnected by a communication network of any form or any medium. Examples of the communication network include a local area network (LAN), a wide area network (WAN), an internet network (for example, the Internet), and an end-to-end network (for example, an ad hoc end-to-end network), and any currently known or future developed network.

The storage medium may be included in the above electronic device, or may exist alone without being assembled into the electronic device.

The above storage medium stores one or more programs. The one or more programs, when loaded and run by a processor of an electronic device, cause the electronic device to perform any method for a processing device or a display device according to any embodiment of the present disclosure.

The computer program codes for executing the operations of the present disclosure may be written in one or more programming languages or a combination thereof. The above programming languages include, but not limited to, object-oriented programming languages, such as Java, Smalltalk and C++, and further include conventional procedural programming languages, for example, "C" language or the like. The program codes may be executed entirely on a user computer, partly on the user computer, as an independent software package, partly on the user computer and partly on a remote computer, or entirely on the remote computer or a server. In the case of the remote computer, the remote computer may be connected to the user computer through any type of network, including the LAN or WAN, or may be connected to an external computer (for example, the Internet connection by an Internet service provider).

It should be noted that the above storage medium in the present disclosure may be a computer-readable signal medium, a computer-readable storage medium, or any combination of the two. The computer-readable storage medium may be, for example, but not limited to, an electrical, magnetic, optical, electromagnetic, infrared, or semiconductor system, apparatus, device, or a combination of any of the above. More specific examples of the computer-readable storage medium may include, but not limited to: an electrical connection with one or more wires, a portable computer disk, a hard disk, a random-access memory (RAM), a read-only memory (ROM), an erasable programmable read-only memory (EPROM or flash memory), optical fiber, a portable compact disc read-only memory (CD-ROM), an optical storage device, a magnetic storage device, or any suitable combination thereof. In the present disclosure, the computer-readable storage medium may be any tangible medium containing or storing a program, and the program may be used by or in combination with an instruction execution system, apparatus, or device. In the present disclosure, the computer-readable signal medium may include a data signal propagated in a baseband or as part of a carrier wave, and the computer-readable signal medium carries a computer-readable program code. The propagated data signal may be in many forms, including but not limited to an electromagnetic signal, an optical signal, or any suitable combination of the above. The computer-readable signal medium may further be any storage medium other than the computer-readable storage medium, and the computer-readable signal medium may send, propagate, or transmit the program used by or in combination with the instruction execution system, apparatus, or device. The program code contained in the storage medium may be transmitted by any suitable medium, including, but not limited to: a wire, an optical cable, radio frequency (RF), etc., or any suitable combination of the above.

The flowcharts and block diagrams in the drawings illustrate system architectures, functions and operations that may be implemented by the system, method, and computer program product according to the embodiments of the present disclosure. In this regard, each block in the flowcharts or block diagrams may represent a module, a program segment, or a portion of code, and the module, the program segment, or the portion of code includes one or more of executable instructions for implementing specific logic functions. It should be noted that, in some alternative implementations, the functions noted in the blocks may further occur in a sequence different from the sequence illustrated in the drawings. For example, two consecutive blocks may be executed simultaneously, or may sometimes be executed in the opposite order, which is depended on the functions involved. It is further noted that each block in the block diagrams and/or flowcharts, and combinations of the blocks in the block diagrams and/or flowcharts may be implemented in a dedicated hardware-based system that performs the specified functions or actions, or may be implemented by the combination of dedicated hardware and computer instructions.

The functions described hereinabove may be at least partially executed by one or more hardware logic components. For example, without limitation, available exemplary types of the hardware logic components include: a field programmable gate array (FPGA), an application specific integrated circuit (ASIC), an application specific standard product (ASSP), a system on chip (SOC), a complex programmable logical device (CPLD) and so on.

Described above are merely exemplary embodiments of the present disclosure and for illustration of the applied technical principles. Those skilled in the art should understand that the disclosure scope of the present disclosure is not limited to the technical solutions formed by the specific combination of the above technical features, and should further cover other technical solutions formed by freely combining the above technical features or their equivalent features without departing from the above disclosed concept. For example, the technical solutions formed by replacing the above features and the technical features (but not limited to) with similar functions disclosed in the present disclosure.

In addition, various operations are described in a specific order, however, it should not be understood that the operations need to be performed in the specific order shown or a sequential order. Under certain circumstances, multitasking and parallel processing may be advantageous. Likewise, although several specific implementation details are included in the above discussion, these should not be construed as limitation on the scope of the present disclosure. Some features described in context of the separate embodiment may further be implemented in combination in single embodiment. On the contrary, various features described in the context of the single embodiment may further be implemented in a plurality of embodiments individually or in any suitable sub-combination.

Although the subject matter has been described in language specific to structural features and/or method logical actions, it should be understood that the subject matter defined in appended claims is not necessarily limited to the specific features or actions described above. On the contrary, the specific features and actions described above are merely exemplary forms for implementing the claims.

Various embodiments of the present disclosure have been described in detail above, but the present disclosure is not limited to these specific embodiments. Those skilled in the art can make various variations and modified embodiments based on the concept of the present disclosure, and such variations and modifications should be regarded as falling within the protection scope of the present disclosure.

What is claimed is:

1. A method for transmitting information, applicable to a processing device, the method comprising:
acquiring a target image of a display device;
determining a target area in the target image; and
sending display information to the display device;
wherein the display information comprises information of the target area, the target area is a partial pixel area of the target image, the target area comprises pixels with transparencies less than 1, and transparencies of pixels outside the target area in the target image are all 1;
wherein the target image is an $(N+1)^{th}$ frame image, N being greater than or equal to 1 an $N^{th}$ frame image is a previous frame image of the $(N+1)^{th}$ frame image, and the target area in the $N^{th}$ frame image is displayed before the target area in the $(N+1)^{th}$ frame image;
and in a case that a non-overlapping area is present between the target area in the $N^{th}$ frame image and the target area in the $(N+1)^{th}$ frame image, a target indication is added in the display information of the $(N+1)^{th}$ frame image to prevent from displaying the non-overlapping area in the target area in the $N^{th}$ frame image in the case of displaying the target area in the $(N+1)^{th}$ frame image, wherein the target indication is configured to indicate that transparencies of pixels in the non-overlapping area are all 1.

2. The method according to claim 1, wherein the transparency of at least one edge pixel of the pixels in the target area is less than 1.

3. The method according to claim 1, wherein the information of the target area comprises: a base coordinates of any pixel in the target area in the target image, reference coordinates corresponding to a target row of pixels in the target area, and a pixel value of a target pixel in the target row of pixels;
the target row of pixels comprises P target pixels, wherein in the case that P is greater than 1, the P target pixels are contiguous;
the transparency of an edge target pixel in the P target pixels along a pixel row direction is less than 1;
in the case that the target row of pixels comprises other pixels than the P target pixels, the transparencies of the other pixels are equal to 1; and
the reference coordinates corresponding to the target row of pixels are configured to indicate: coordinates of the target pixel in the target row of pixels relative to the base coordinate.

4. The method according to claim 3, wherein the reference coordinates corresponding to the target row of pixels comprise: coordinates of the edge target pixel relative to the base coordinates.

5. The method according to claim 4, wherein the information of the target area comprises: the base coordinates arranged in sequence, and information items of the target rows of pixels in the target area, wherein the information items of the target rows of pixels are arranged according to a sequence of pixel rows; and
the information items of the target row of pixels comprise: the reference coordinates corresponding to the target row of pixels arranged in sequence, and the pixel value of the target pixel.

6. The method according to claim 5, wherein the information of the target area meets any one of the following conditions:
in the case that the target area comprises at least one pixel other than the target pixel, the information of the target area further comprises: a pixel value of the at least one pixel arranged following the information items of the target rows of pixels;
in the case that the target row of pixels further comprises the other pixels, the information items of the target row of pixels further comprise: pixel values of the other pixels arranged following the pixel value of the target pixel; in the case that the target area comprises other rows of pixels than the target row of pixels, the information of the target area further comprises information items of the other rows of pixels, wherein the information items of the other rows of pixels comprise: the pixel values of the pixels in the other rows of pixels; and the information items of the other rows of pixels are arranged following the information items of the target rows of pixels; and
in the case that the target row of pixels further comprises the other pixels, the information items of the target row of pixels further comprise: the pixel values of the other pixels arranged following the pixel value of the target pixel; in the case that the target area comprises the other rows of pixels than the target row of pixels, the information of the target area further comprises the information items of the other rows of pixels, wherein the information items of the other rows of pixels comprise: the pixel values of the pixels in the other rows of pixels; and the information items of the rows of pixels in the target area are arranged according to the sequence of the pixel rows.

7. The method according to claim 4, wherein the information of the target area comprises: the base coordinates arranged in sequence, the reference coordinates corresponding to the target rows of pixels, and the pixel values of the target pixel in the target rows of pixels; and
the reference coordinates corresponding to the target rows of pixels are arranged according to the sequence of the pixel rows, and the pixel values of the target pixels in the target rows of pixels are arranged according to the sequence of the pixel rows.

8. The method according to claim 7, wherein in the case that the target area comprises at least one pixel other than the target pixel, the information of the target area further comprises: a pixel value of the at least one pixel arranged following the pixel values of the target pixel in the target rows of pixels.

9. The method according to claim 4, wherein the information of the target area further comprises: resolution information of the target area.

10. The method according to claim 4, wherein the transparency of at least one edge pixel of the pixels in the target area is less than 1, and the information of the target area further comprises: the resolution information of the target area;
the information of the target area meets any one of the following conditions:
the information of the target area comprises: the base coordinates arranged in sequence, and information items of target rows of pixels in the target area, wherein the information items of the target rows of pixels are arranged according to the sequence of the pixel rows; the information items of the target row of pixels comprise: the reference coordinates corresponding to the target row of pixels arranged in sequence, and the pixel value of the target pixel;

the information of the target area comprises: the base coordinates arranged in sequence and the information items of the target rows of pixels in the target area, wherein the information items of the target rows of pixels are arranged according to the sequence of the pixel rows; the information items of the target row of pixels comprise: the reference coordinates corresponding to the target row of pixels arranged in sequence, and the pixel value of the target pixel; and in the case that the target area comprises at least one pixel other than the target pixel, the information of the target area further comprises: a pixel value of the at least one pixel arranged following the information items of the target rows of pixels;

the information of the target area comprises: the base coordinates arranged in sequence and the information items of the target rows of pixels in the target area, wherein the information items of the target rows of pixels are arranged according to the sequence of the pixel rows; the information items of the target row of pixels comprise: the reference coordinates corresponding to the target row of pixels arranged in sequence, and the pixel value of the target pixel; in the case that the target row of pixels further comprises the other pixels, the information items of the target row of pixels further comprise: pixel values of the other pixels arranged following the pixel value of the target pixel; in the case that the target area comprises other rows of pixels than the target row of pixels, the information of the target area further comprises information items of the other rows of pixels, wherein the information items of the other rows of pixels comprise: the pixel values of the pixels in the other rows of pixels; and the information items of the other rows of pixels are arranged following the information items of the target rows of pixels;

the information of the target area comprises: the base coordinates arranged in sequence and the information items of the target rows of pixels in the target area, wherein the information items of the target rows of pixels are arranged according to the sequence of the pixel rows; the information items of the target row of pixels comprise: the reference coordinates corresponding to the target row of pixels arranged in sequence, and the pixel value of the target pixel; in the case that the target row of pixels further comprises the other pixels, the information items of the target row of pixels further comprise: the pixel values of the other pixels arranged following the pixel value of the target pixel; in the case that the target area comprises the other rows of pixels than the target row of pixels, the information of the target area further comprises the information items of the other rows of pixels, wherein the information items of the other rows of pixels comprise: the pixel values of the pixels in the other rows of pixels; and the information items of the rows of pixels in the target area are arranged according to the sequence of the pixel rows;

the information of the target area comprises: the base coordinates arranged in sequence, the reference coordinates corresponding to the target rows of pixels, and the pixel values of the target pixel in the target rows of pixels,
wherein the reference coordinates corresponding to the target rows of pixels are arranged according to the sequence of the pixel rows, and the pixel values of the target pixels in the target rows of pixels are arranged according to the sequence of the pixel rows; and the information of the target area comprises: the base coordinates arranged in sequence, the reference coordinates corresponding to the target rows of pixels, and the pixel value of the target pixel in the target rows of pixels,
wherein the reference coordinates corresponding to the target rows of pixels are arranged according to the sequence of the pixel rows, and the pixel values of the target pixels in the target rows of pixels are arranged according to the sequence of the pixel rows; in the case that the target area comprises at least one pixel other than the target pixel, the information of the target area further comprises: the pixel value of the at least one pixel arranged following the pixel values of the target pixel in the target rows of pixels.

11. A non-transitory computer-readable storage medium storing a computer program including one or more instructions therein, wherein the computer program, when loaded and run by a processor of an electronic device, causes the electronic device to perform the method for transmitting information as defined in claim 1.

12. An electronic device comprising: a processor, a memory, and a bus;
wherein the memory stores one or more machine-readable instructions executable by the processor, and the processor communicates with the memory via the bus in response to the electronic device operating, wherein the one or more machine-readable instructions, when loaded and executed by the processor, cause the processor to perform the method for transmitting information as defined in claim 1.

13. A method for transmitting information, applicable to a display device, the method comprising:
receiving display information from a processing device, wherein the display information comprises information of a target area; and
displaying the target area based on the information of the target area;
wherein the target area is a partial pixel area of the target image, the target area comprises pixels with transparencies less than 1, and transparencies of pixels outside the target area in the target image are all 1;
wherein the target image is an $(N+1)^{th}$ frame image, N being greater than or equal to 1, an $N^{th}$ frame image is a previous frame image of the $(N+1)^{th}$ frame image, and the target area in the $N^{th}$ frame image is displayed before the target area in the $(N+1)^{th}$ frame image;
and in a case that a non-overlapping area is present between the target area in the $N^{th}$ frame image and the target area in the $(N+1)^{th}$ frame image, a target indication is added in the display information of the $(N+1)^{th}$ frame image to prevent from displaying the non-overlapping area in the target area in the $N^{th}$ frame image in the case of displaying the target area in the $(N+1)^{th}$ frame image, wherein the target indication is configured to indicate that transparencies of pixels in the non-overlapping area are all 1.

14. The method according to claim 13, wherein the information of the target area comprises: base coordinates of any pixel in the target area in the target image, reference coordinates corresponding to a target row of pixels in the target area, and a pixel value of a target pixel in the target row of pixels; the target row of pixels comprises P target pixels, and in the case that P is greater than 1, the P target pixels are contiguous; a transparency of an edge target pixel in the P target pixels along a pixel row direction is less than 1; in the case that the target row of pixels comprises other pixels than the P target pixels, transparencies of the other pixels are equal to 1; and the reference coordinates corresponding to the target row of pixels are configured to indicate: coordinates of the target pixel in the target row of pixels relative to the base coordinates; and displaying the target area based on the information of the target area comprises:

determining the coordinates of the target pixel in the target image based on the base coordinates and the reference coordinates corresponding to the target row of pixels;

determining the coordinates and pixel values of the pixels in the target area in the target image based on a resolution of the target area, the base coordinates, the coordinates of the target pixel in the target image, and the pixel value in the information of the target area; and displaying the target area based on the coordinates and pixel values of the pixels in the target image.

15. A non-transitory computer-readable storage medium storing a computer program including one or more instructions therein, wherein the computer program, when loaded and run by a processor of an electronic device, causes the electronic device to perform the method for transmitting information as defined in claim 13.

16. An electronic device comprising: a processor, a memory, and a bus;

wherein the memory stores one or more machine-readable instructions executable by the processor, and the processor communicates with the memory via the bus in response to the electronic device operating, wherein the one or more machine-readable instructions, when loaded and executed by the processor, cause the processor to perform the method for transmitting information as defined in claim 13.

17. A system for transmitting information, comprising: a processing device and a display device; wherein the processing device is configured to: acquire a target image of the display device; determine a target area in the target image; and send display information to the display device, wherein the display information comprises information of the target area, the target area is a partial pixel area of the target image, the target area comprises pixels with transparencies less than 1, and transparencies of pixels outside the target area in the target image are all 1; and the display device is configured to: receive the display information from the processing device, wherein the display information comprises the information of the target area; and display the target area based on the information of the target area;

wherein the target image is an $(N+1)^{th}$ frame image, N being greater than or equal to 1, an $N^{th}$ frame image is a previous frame image of the $(N+1)^{th}$ frame image, and the target area in the $N^{th}$ frame image is displayed before the target area in the $(N+1)^{th}$ frame image;

and in a case that a non-overlapping area is present between the target area in the $N^{th}$ frame image and the target area in the $(N+1)^{th}$ frame image, a target indication is added in the display information of the $(N+1)^{th}$ frame image to prevent from displaying the non-overlapping area in the target area in the $N^{th}$ frame image in the case of displaying the target area in the $(N+1)^{th}$ frame image, wherein the target indication is configured to indicate that transparencies of pixels in the non-overlapping area are all 1.

* * * * *

UNITED STATES PATENT AND TRADEMARK OFFICE
CERTIFICATE OF CORRECTION

PATENT NO. : 11,983,911 B2
APPLICATION NO. : 17/513785
DATED : May 14, 2024
INVENTOR(S) : Jinghua Miao et al.

Page 1 of 1

It is certified that error appears in the above-identified patent and that said Letters Patent is hereby corrected as shown below:

On the Title Page

The (71) applicants should read:
Beijing BOE Optoelectronics Technology Co., Ltd., Beijing (CN); BOE Technology Group Co., Ltd., Beijing (CN)

The (72) inventors should read:
Jinghua MIAO, Beijing (CN); Hao ZHANG, Beijing (CN); Lili CHEN, Beijing (CN); Wenyu LI, Beijing (CN); Xuefeng WANG, Beijing (CN); Qingwen FAN, Beijing (CN); Yufan DU, Beijing (CN)

Signed and Sealed this
Eighteenth Day of June, 2024

Katherine Kelly Vidal
*Director of the United States Patent and Trademark Office*